United States Patent
Hallan et al.

(10) Patent No.: US 6,632,356 B2
(45) Date of Patent: Oct. 14, 2003

(54) SEPARATION MEMBRANE END CAP

(75) Inventors: Matthew Jon Hallan, Minneapolis, MN (US); Jon E. Johnson, Plymouth, MN (US); Lance Dallas Johnson, Eden Prairie, MN (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/920,488

(22) Filed: Aug. 1, 2001

(65) Prior Publication Data

US 2003/0024868 A1 Feb. 6, 2003

(51) Int. Cl.⁷ .................. B01D 63/00; B01D 61/00; B01D 53/22; C02F 1/44
(52) U.S. Cl. .............. 210/321.6; 210/652; 210/321.76; 210/321.78; 210/321.85; 210/321.87; 96/9
(58) Field of Search .................... 210/232, 650–654, 210/321, 323, 433, 494, 495, 321.74, 321.72

(56) References Cited

U.S. PATENT DOCUMENTS

| 1,812,553 A | 6/1931 | Redfield |
| 3,667,785 A | 6/1972 | Kapeker .............. 285/231 |
| 3,928,204 A | * 12/1975 | Thomas |

(List continued on next page.)

FOREIGN PATENT DOCUMENTS

| CH | 362892 | 8/1962 | |
| DE | 28 14 497 A1 | 10/1979 | |
| EP | 0 487 831 A1 | 6/1996 | .......... B01D/29/15 |
| FR | 1351039 | 12/1964 | |
| GB | 2 270 357 A | 3/1994 | |
| SU | 1707408 A1 | 1/1992 | |
| WO | WO 97/06693 | 2/1997 | |

OTHER PUBLICATIONS

JP 11267468 A, *Patent Abstracts of Japan* vol. 2000, No. 1, Oct. 5, 1999, Japanese Abstract.
Scanning the field for ideas, Machine Design, vol. 33, No. 16, p. 81, Aug. 3, 1961.
Derwent Abstract, Jan. 1992.
English abstract of JP 06055043, publication date Mar. 1, 1994.
English abstract JP 07313848 A, publication date Dec. 12, 1995.
English abstract JP 11197463 A, publication date Jul. 27, 1999.
English abstract JP 11197464 A, publication date Jul. 27, 1999.
English abstarct JP 11197466 A, publication date Jul. 27, 1999.

(List continued on next page.)

*Primary Examiner*—W. L. Walker
*Assistant Examiner*—Krishnan Menon (57) ABSTRACT

A separation end cap adapted for connecting adjacent separation elements is provided. The end cap may be located at the distal ends of a separation element and is adapted for connection with a permeate tube located within the separation element. In one embodiment the end cap includes an inner hub for receiving an O-ring to seal against an inner hub of an end cap on an adjacent separation element. The inner hub of the end cap may be spin-welded to the outer surface of the permeate tube. A locking structure on an outer hub of the end cap co-acts with a locking structure on an end cap of an adjacent separation element to releaseably lock the end caps and, therefore, adjacent separation elements. The locking structure preferably provides a predetermined axial force on the O-ring to seal the connection between permeate tubes of adjacent separation elements. The locking structure may also provide audible and/or visual feedback that the locking of adjacent end caps has been achieved

16 Claims, 5 Drawing Sheets

U.S. PATENT DOCUMENTS

| | | | |
|---|---|---|---|
| 4,066,281 A | 1/1978 | De Bonis | 285/31 |
| 4,268,046 A | 5/1981 | Nisper | 277/139 |
| 4,296,951 A * | 10/1981 | Zimmerly | |
| 4,303,103 A | 12/1981 | Marks et al. | 138/97 |
| 4,346,922 A | 8/1982 | Ohtsuga et al. | 285/109 |
| 4,685,704 A | 8/1987 | Kolar | 285/109 |
| 4,690,434 A | 9/1987 | Schmidt | 285/31 |
| 4,697,423 A | 10/1987 | Conrad et al. | 60/605 |
| 4,858,958 A | 8/1989 | Harbeke | 285/31 |
| 5,011,193 A | 4/1991 | Porte | 285/31 |
| 5,106,129 A | 4/1992 | Camacho et al. | 285/233 |
| 5,108,604 A * | 4/1992 | Robbins | |
| 5,316,352 A | 5/1994 | Smith | 285/370 |
| 5,538,642 A | 7/1996 | Solie | 210/652 |
| 5,681,467 A | 10/1997 | Solie et al. | 210/486 |
| 5,851,267 A | 12/1998 | Schwartz | 96/7 |
| 6,066,254 A | 5/2000 | Huschke et al. | 210/282 |
| 6,224,767 B1 | 5/2001 | Fujiwara et al. | 210/323.1 |

OTHER PUBLICATIONS

English abstract JP 11207156 A, publication date Aug. 3, 1999.

English abstract JP 11267467, publication date Oct. 5, 1999.

English abstract JP 11267468, publication date Oct. 5, 1999.

English abstract JP 11267469, publication date Oct. 5, 1999.

English abstract JP 11267470 A, publication date Oct. 5, 1999.

English abstract JP 62247804 A, publication date Oct. 28, 1987.

English abstract JP 2000015064 A, publication date Jan. 18, 2000.

* cited by examiner

SEPARATION MEMBRANE END CAP

FIELD OF THE INVENTION

The present invention relates to separation elements useful for separating various components of fluids. More specifically, the present invention relates to a seal structure for sealing adjacent separation elements.

DESCRIPTION OF THE RELATED ART

The use of pressure driven fluid separation systems are well known. In such systems, a fluid mixture is passed across the surface of a membrane adapted to act as a selective barrier, permitting some components of the fluid composition to pass through more readily than others.

Hollow fiber and spiral wound membrane arrangements are commonly used in commercial fluid separation processes. The use of spiral wound membranes is advantageous in that it affords a large membrane contact area while permitting a rather small overall containment vessel. A standard way of supplying spiral wound membranes for commercial use is in the form of membrane elements which comprise a section of a permeate tube or conduit around which the membrane is wound. These membrane elements may then be used singly or joined together in series by interconnecting their permeate conduit sections. The usual way to use spiral wound membrane elements is to contain them, either singly or multiple in containment vessels to form fluid separation modules. The modules can, in turn, be used singly or can be conveniently interconnected in series and/or parallel arrangements to provide the desired treatment.

Spiral wound membranes are typically formed by wrapping one or more sheets of membrane material around a central conduit containing holes for recovery of a central permeate stream. Spacers or other devices can be used to maintain feed-retentate channels through which the feed mixture passes and is separated into the retentate component or permeate components that pass through the membrane surface. Examples of spiral wound elements are provided in U.S. Pat. Nos. 5,538,642 and 5,681,467, both of which are incorporated herein by reference.

When multiple membrane elements are used in series within a single module, it is desirable to seal adjacent elements to one another, and particularly the corresponding adjacent permeate tubes to prevent the flow of feed fluid or retentate fluid into the permeate tube. Typically, this is accomplished by the use of a sliding seal arrangement such as that disclosed in U.S. Pat. No. 5,851,267 to Schwartz, incorporated herein by reference. In such a sliding seal arrangement, an interconnect pipe or tube is received within the ends of adjacent permeate tubes of adjacent separation elements. The interconnect pipe defines a pair of spaced apart grooves on the ends thereof that each receive and retain an O-ring. The O-rings are arranged to segregate the permeate and retentate fluids by applying radial pressure between the outer ends of the interconnect pipe and the inner surfaces of the respective permeate tubes. In an additional embodiment, the O-rings are arranged to segregate the permeate and retentate fluids by applying radial pressure between the inside ends of he interconnect pipe and the outer surface of the respective permeate tubes.

U.S. Pat. No. 5,581,267 further discloses a pair of end caps located on the respective ends of the separation membrane. Each end cap defines an inner opening for receiving the permeate tube of the separation element and an outer locking ring for securing adjacent separation elements together. An O-ring is retained on the locking ring to provide a seal at the outer radial periphery of the end caps. This seal is between adjacent end caps and provides a seal to prevent the feed stream or retentate stream from bypassing separation elements by flowing along the pressure vessel wall.

Additional end cap structures are shown in Japanese Publication No. 11207156 wherein the end cap includes an integral interconnect tube having a seal structure disposed on each end for insertion into an adjacent permeate tube. A similar structure is shown in U.S. Pat. No. 6,224,767, incorporated herein by reference. Japanese Publication No. 11267467 also shows an interconnect tube having seals on either end thereof.

In another method of interconnecting the tubes is shown in Japanese Patent No. 2000015064. In this assembly, an interconnection pipe having a variety of inner diameters is used to control the pressure loss in the permeate tube.

Each of these methods requires an interconnect pipe of some sort having a relatively smaller diameter than the permeate tube. Typically the interconnect pipes or tubes are inserted into the ends of adjacent permeate tubes, resulting in increased pressure loss. In an additional embodiment the interconnect pip has a relatively larger diameter than the permeate tube. This arrangement eliminates the pressure lass, but decreases the effective length of each separation element. There are further disadvantages associated with both of these schemes. Upon insertion of the interconnect pipes, the O-rings are subject to deformation or becoming dislodged from the groove, resulting in an ineffective seal. In certain installations of the interconnect pipes of this type, it has been known to add a lubricant to the O-ring to facilitate installation. The lubricant can provide a contamination problem in the permeate stream.

SUMMARY OF THE INVENTION

According to the present invention, there is provided a separation element adapted to be joined to an adjacent separation element for placement in a separation module. The separation element comprises a permeable separation body defining a permeate channel in fluid communication with a first side of said separation body for collecting permeate. The separation element further comprises a permeate tube in fluid communication with the permeate channel. The permeate tube extends between first and second ends. A separation element further comprises a retentate channel on a second side of the permeable separation body. The separation element further comprises a seal surface connected with the tube and adapted to engage a sealing member and axially compress the sealing member between the seal surface and a seal surface of adjacent separation elements. This prevents fluid flow from the retentate channel into the permeate tube at the end of the permeate tube.

Accordingly, it is an object of the present invention to provide a seal structure between adjacent separation elements that reduces the number of seal surfaces, thereby reducing the risk of contamination in the permeate stream.

It is another object of the present invention to provide a seal structure between adjacent separation elements connected to the permeate tube that is axially compressed to provide a fluid tight connection between the permeate tubes of adjacent separation elements.

It is another object of the present invention to provide a seal structure between adjacent separation elements that uses the naturally-occurring pressure drop within the feed-retentate channel to provide additional axial compressive force on the seal structure, thereby improving the effectiveness of the seal during operation.

It is another object of the present invention to provide a seal structure that eliminates twisting or sliding of the seal structure during installation of the separation elements into the separation module.

It is another object of the present invention to provide a seal structure that reduces the possibility of deformation of the seal structure during installation of the separation elements into the separation module.

It is another object of the present invention to fix the position of the seal structure to prevent abrasion of the seal structure due to movement of the separation module or seal structure during operation.

It is another object of the present invention to provide a seal structure that does not restrict the fluid flow in the permeate tube.

It is another object of the present invention to provide a seal structure that does not reduce the effective length of the separation elements.

It is another object of the present invention to provide a locking arrangement between adjacent separation elements that secures the separation elements and provides a predetermined amount of axial compression on the seal structure.

It is another object of the present invention to eliminate the need for a lubricant on the seal structure to facilitate installation of the separation elements, thereby eliminating a potential for contamination in the permeate stream.

It is another object of the present invention to provide a sealing structure that increase the useful life of the seal structure.

It is another object of at least one embodiment of the present invention to provide a locking arrangement between adjacent separation elements that provides an audible or tactile indication that the elements are fully locked together.

It is another object of at least one embodiment of the present invention to recess the sealing surface to protect the sealing surface during handling of the separation elements, prior to installation.

It is another object of at least one embodiment of the present invention to provide a groove for receiving and retaining the sealing structure to avoid unintentional loss of the sealing structure.

It is another object of one embodiment of the present invention to provide a permeate interface adapter that includes the same sealing structure used between adjacent separation elements.

BRIEF DESCRIPTION OF THE DRAWINGS

Other objects and advantages of the present invention will be readily appreciated as the same becomes better understood by reference to the following detailed description when considered in connection with the accompanying drawings wherein.

DETAILED DESCRIPTION

Figure 1:
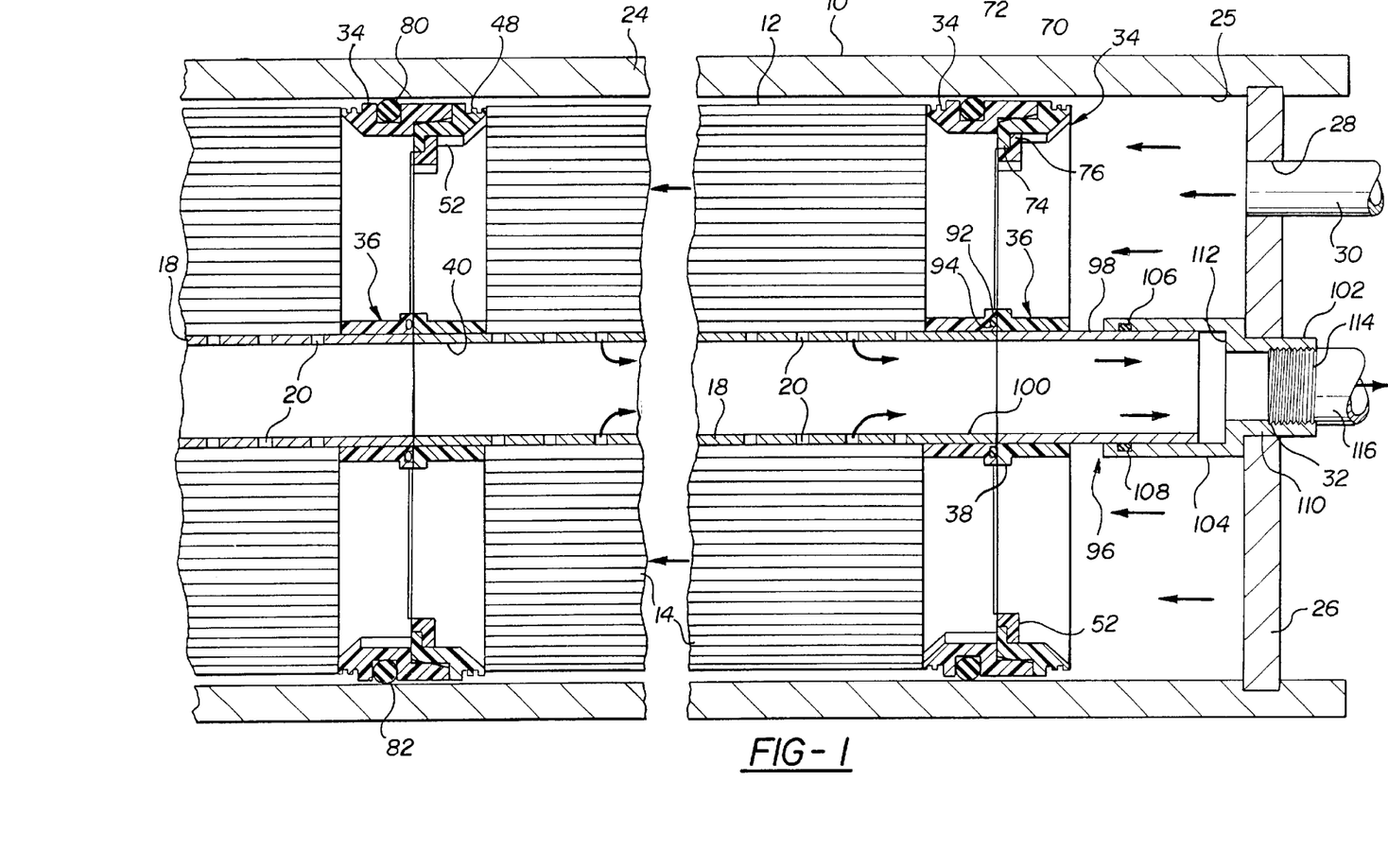
FIG. 1 is a cross-sectional view of a separation module partially broken away showing one preferred embodiment of the present invention.

A separation module is generally shown at 10 in FIG. 1. The module 10 includes a plurality of separation elements generally indicated at 12. The separation element 12 can comprise any well-known separation element that has a surface permeable to one component in a fluid stream and virtually impermeable to another component in the fluid stream. Suitable separation elements 12 may use any type of effective separation material in any arrangement that provides a suitable channel or channels for the passage of the fluid containing the permeable and impermeable components along one side of the separation material and a channel or channels for collection of the permeable components from an opposite side of the separation material. Suitable channels for permeate and retentate can have radial, spiral or other configurations that can pass the fluid containing the permeable and impermeable fluids axially into and axially out of the separation element or collecting the permeate fluid and passing it axially out of the separation element. Examples of applicable embodiments include spiral wound and hollow fiber configurations.

Figure 7:
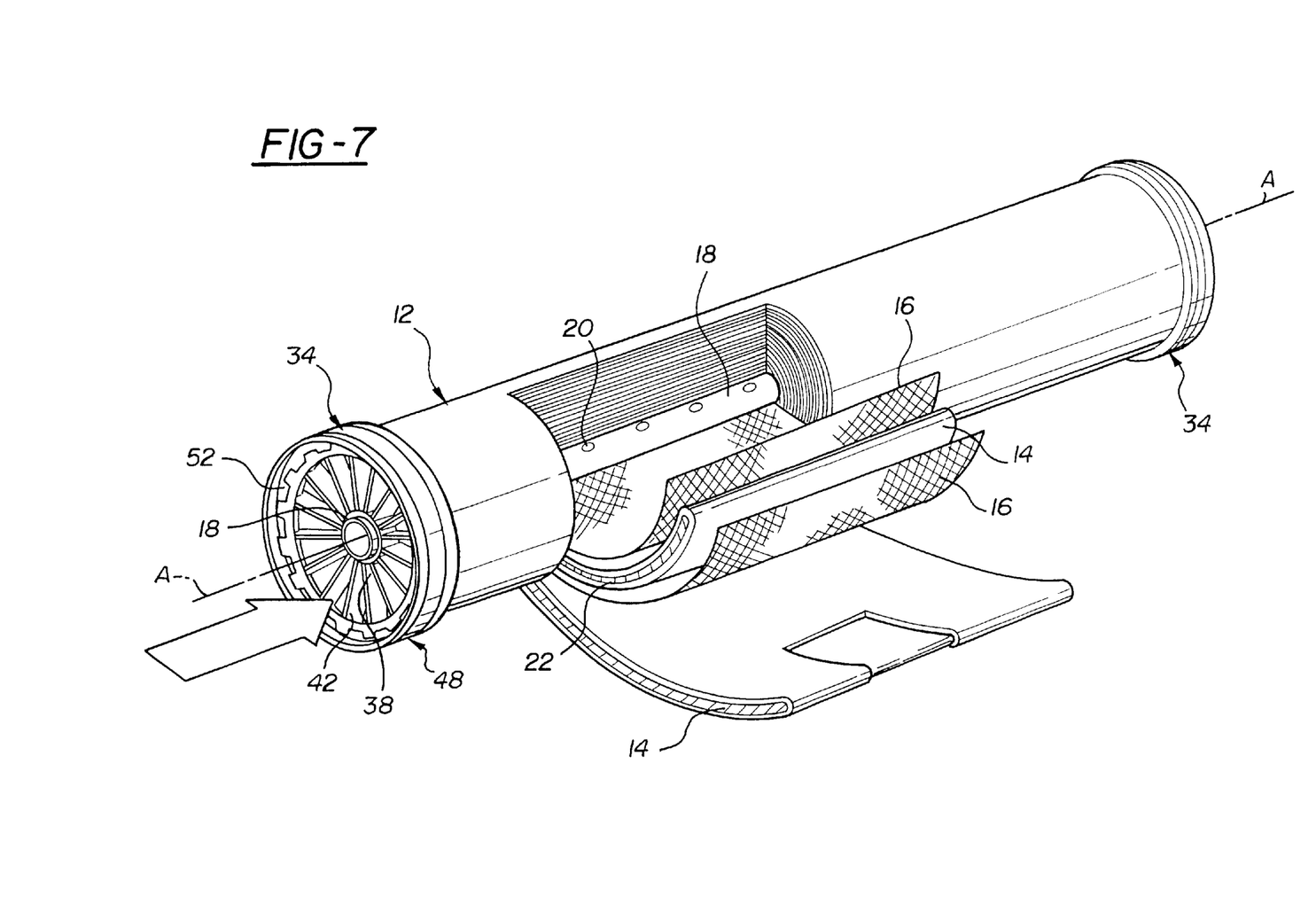
FIG. 7 is a partially exploded perspective view of one preferred separation element.

Flow through the separation element is preferably arranged such that there is a coaxial flow with the permeate flow in the central portion (i.e. along axis A, as shown in FIG. 7) of the element. The arrows in FIG. 1 show the direction of flow of the respective fluids. However, the present invention can be used with separation elements where one or both flows are passed axially through the element from off-center inlet and outlet ports. Suitable separation elements of this type in a variety of configurations are well known to those skilled in the art.

As best shown in FIG. 7, the most preferred arrangements for the separation element 12 comprises a spirally wound element 12 having a plurality of membrane leaves 14. A retentate channel sheet 16 separates each membrane leaf 14. The retentate channel sheet 16 comprises a mesh sheet, as is well known in the art, to provide separation between adjacent leaves 14. The retentate channel sheet 16 defines the retentate channel. Each of the retentate channels is in fluid communication with the retentate channel of an adjacent separation element 12.

Each of the leaves 14 are wound about a permeate tube 18. The permeate tube 18 includes a plurality of holes 20 therethrough. The holes 20 are for receiving the permeate and to allow the permeate to enter the permeate tube 18.

The outermost radial portion of the separation elements, over the leaves 14, may include a cover or shroud. The cover may comprise an impermeable layer that will inhibit any feed or retentate material from passing to the outside of the separation element 12 and between the separation element 12 and the pressure vessel 24. Such covers are well known in the art. The cover may comprise any suitable coating, such as fiberglass, epoxy, or any other sufficient layer of impermeable material about the outside of the leaves 14. Other applicable covers include those described in U.S. Pat. No. 6,066,254 incorporated herein by reference.

Each of the leaves 14 defines a permeate channel in fluid communication with a first side of the leaf 14. The permeate channel is defined by a permeate channel sheet 22 disposed on the inside of the leaf 14. The permeate channel sheet 22 comprises a mesh sheet, as is well known in the art to provide separation of the leaf 14. Each leaf 14 is folded about the permeate channel sheet 22 in the ordinary, well-known fashion and is secured to the permeate tube 18. The open end of the leaf 14 is secured to the permeate tube 18 about the holes 20. Thus, the permeate channel sheet 22 defining the permeate channel is in fluid communication with the holes 20 to allow the permeate fluid flowing into the permeate channel to flow through the permeate channel and through the holes 20 into the permeate tube 18. An example of a separation element having this general structure is commercially available from FilmTec Corporation under the designation "BW30-400".

The permeate channels collect separated permeate for passage through the permeate channel and the retentate channels distribute or collect retentate for communication with the retentate channels. The permeate channel communicates with the holes 20 which permit flow into the permeate tube 18.

As best shown in FIG. 1, the module 10 further includes a pressure vessel 24. Each of the separation elements 12 is contained within the pressure vessel 24. More specifically, the pressure vessel 24 defines an inner opening 25. The separation elements 12 are located in the inner opening 25. While there may only be one element 12 in the pressure vessel 24, there can be up to seven or eight separation elements 12 connected in series within a typical pressure vessel 24. The pressure vessel 24 is closed off with end or bearing plates 26. Both ends of the pressure vessel 24 include an end plate 26. As shown in FIG. 1, the end plate 26 is preferably circular and includes a feed opening 28 connected to a feed tube 30. Also, end plate 26 includes a permeate opening or port 32. The end plate 26 at the other end of the pressure vessel 24 includes a retentate discharge opening (not shown) that is similar to the feed opening 30. The retentate discharge opening allows the retentate to exit the pressure vessel 24. Also, both end plates 26 are equipped with a permeate outlet. Typically, the second of the two permeate outlets is plugged so that the flow of the permeate is only out of the one end of the pressure vessel 24 as shown in FIG. 1.

As describe above, it is common for pressure vessels 24 of the type disclosed herein to have a feed inlet and a retentate outlet. However, it will be appreciated that multiple feed inlets, multiple retenate outlets and multiple permeate outlets may be used.

Each of the separation elements 12 includes an end cap generally indicated at 34 on each end. Each end cap 34 includes an inner hub generally indicated at 36. The inner hub 36 defines an inner hub end surface 38. The inner hub end surface 38 is preferably a flat surface. The inner hub 36 also has an annular opening 40 therethrough. The annular opening 40 is for receiving the permeate tube 18. While the annular opening 40 may be cylindrical, in certain embodiments the inner diameter of the annular opening 40 is tapered to facilitate connection of the end cap 34 with the permeate tube 18, as will be discussed in more detail below. Further, the annular opening and permeate tube 18, while preferably having a circular cross-section, may take any suitable geometric configuration.

As best shown in FIGS. 2–4 and 6, a plurality of ribs or spokes 42 extend radially outwardly from the inner hub 36. The ribs 42 act as an anti-telescoping structure. Specifically, the ribs 42 engage the ends of the leaves 14 to prevent the leaves 14 from telescoping or moving relative to one another. Thus, the ribs 42 confine the leaves 14 therebetween. The ribs 42 also leave a sufficient flow path for the feed or retentate to exit one separation element 12 enter an adjacent element 12.

Figure 3:
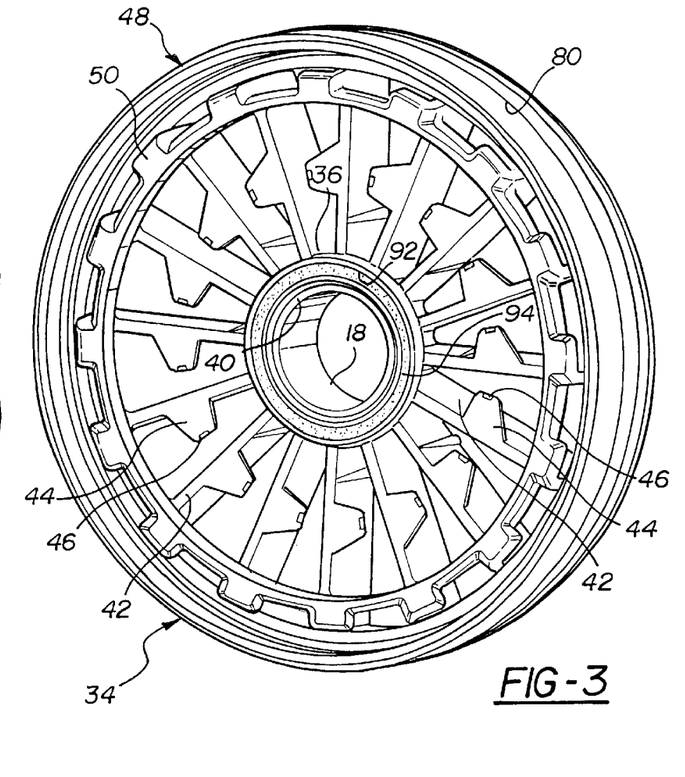
FIG. 3 is a perspective view showing another preferred embodiment of the end cap.
Figure 6:
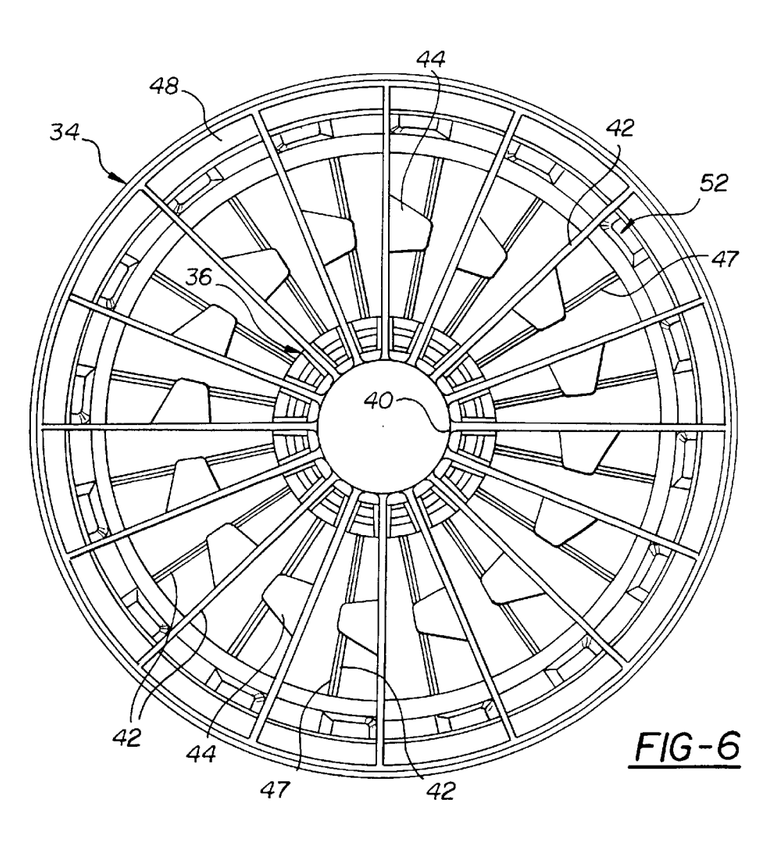
FIG. 6 is an end view of one preferred embodiment of an end cap set.

In one preferred embodiment, as shown in FIGS. 3 and 6, each rib may include a flange 44 thereon. A protrusion 46 extends outwardly from the flange 44. The protrusion 46 is for passing over a rib 42 of an adjacent end cap as shown in FIG. 6. More specifically, each rib may define a channel or recess 47 on the outer edge surface thereof. The protrusion 46 passes over one outwardly extending surface of the rib 42 and into the channel 47. The protrusion 46 thus is retained in the channel 47. As several of the protrusions 46 simultaneously pass into respective channels 47 and audible as well as physical indication can be observed to provide feedback that the respective end caps are locked in position as will be described below.

Figure 2:
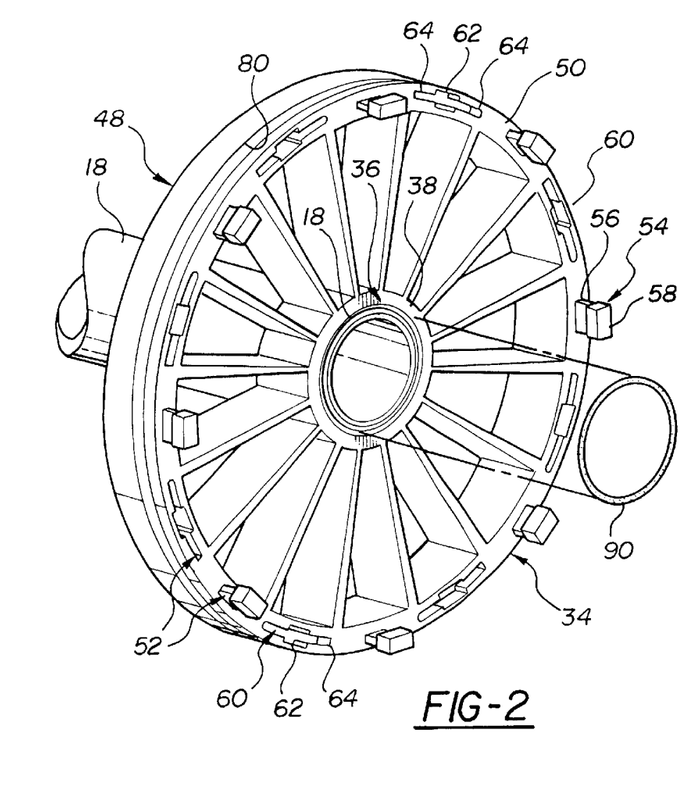
FIG. 2 is an exploded view of one preferred end cap in accordance with the present invention and showing the permeate tube.

The end cap 34 further includes an outer hub generally indicated at 48. The outer hub 48 defines an outer hub surface 50 thereon. A locking structure generally indicated at 52 is further disposed on the end cap 34. The locking structure 52 is adapted to secure end cap 34 with an end cap 34 of an adjacent separation element 12 is shown in FIG. 1. The locking structure 52 is preferably disposed on the outer hub surface 50. The locking structure 52 comprises a plurality of projections and receptacles disposed about the outer hub surface 50. The projections and receptacles may take any of a number of forms. As shown in FIG. 2, the projections comprise a plurality spades 54. Each spade 54 has an inner relatively thin section 56 and an outer head portion 58. The head portion 58 has a thickness greater than that of the inner section 56.

The receptacles comprise openings 60 in the outer hub surface 50. As shown, the openings 60 have a central area 62. The central area 62 is large enough to permit the head 58 of the spade 54 to pass into the opening 60. A channel is formed under the outer hub surface 50 for receiving the head 58 of the spade 54. The opening 60 includes side sections 64. The side sections 64 have a smaller width than that of the central area 62. The side sections 64 allow the inner section 56 of the spade 54 to pass therethrough, but will not allow the head 58 to pass therethrough.

Therefore, in order to lock end caps of this type, adjacent end caps are aligned such that the heads 58 of the spades 54 are aligned with the central areas 62 of the openings 60 of the adjacent end cap 34. The end caps 34 are pushed together until the respective outer hub surfaces 50 engage. The end caps 34 are then rotated relative to one another in either a clockwise or counter-clockwise direction until the inner sections 56 of the spades 54 bottom out at the end of either of the side sections 64 of openings 60. Once in this position, the end caps cannot be axially moved with respect to one another. Disassembly of this connection of the end caps 34 is accomplished simply by relatively rotating the end caps 34 in the opposite direction until the heads 58 align with the central area 62 of the opening. The end caps 34, when in this position, can be moved axially with respect to one another to disassemble one separation element 12 from an adjacent separation element 12. Also, the end cap 34 of FIG. 2 of adjacent separation elements 12 has the identical locking structure 52. Thus, an end cap 34 having the identical locking structure 52 is placed on both ends of the separation element 12.

Figure 4:
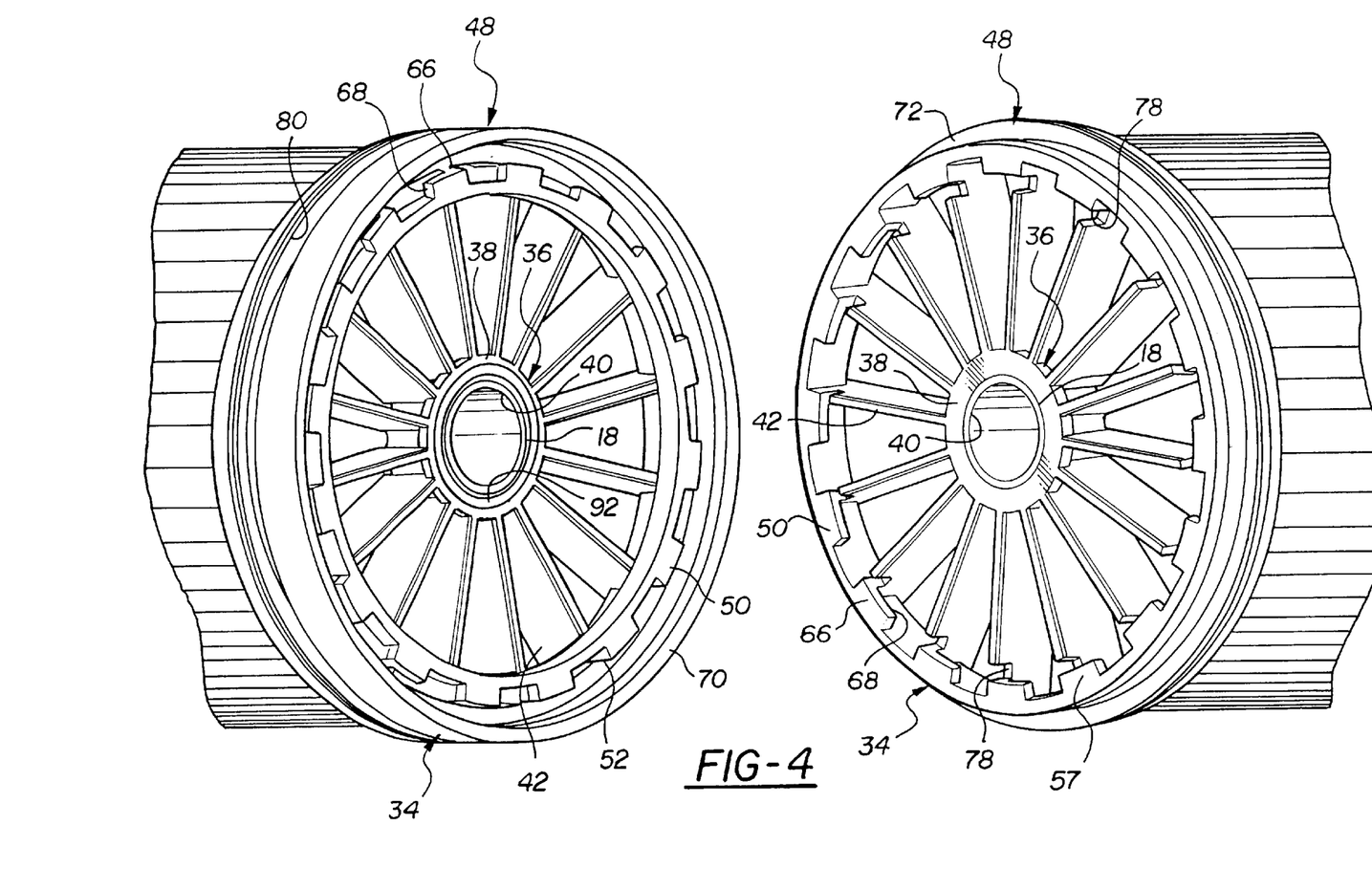
FIG. 4 is a perspective view, partially broken away, showing another preferred end cap set.

An alternative locking structure 52 is shown in FIG. 4. As shown in FIG. 4, the projections comprise a plurality of L-shaped catches 66. The L-shaped catches 66 provide for a slot 68 therebehind. The slots 68 comprise the receptacle for receiving the outermost legs of the L-shaped catches 66. Thus, the outer leg of the L-shaped catch 66 is received behind the slot 68 to thereby axially lock adjacent end caps 34 relative to one another.

As best seen in FIG. 4, one of the end caps 34 includes an outer annular flange 70. The outer annular flange 70 protrudes axially outwardly from the end cap beyond the outer hub surface 50. The flange 70 protects the permeate tube seal from damage during handling of the separation element 12. The other of the end caps 34 in the set shown in FIG. 4 includes an outer annular recess 72. The outer annular recess 72 is for receiving the outer annular flange 70 of the opposite end cap 34. As shown in FIG. 1, one or more of the outer legs of the L-shaped catches 66 on one end cap 34 may include a protrusion 74. Similarly, the opposite outer leg of the L-shaped catches 66 on the adjacent end cap 34 may include small recesses 76 for receiving the protrusions 74. The purpose of the protrusion is to seat in the recess 76 when the end caps 34 are locked to provide audible and physical feedback that the end caps 34 are in the fully locked position.

The outer hub surface 50 of one of the end caps 34 (the one on the left) having the outer annular flange 70 thereon, extends slightly forwardly of the outermost surface of the ribs 42. The adjacent end cap 34 includes a notch 78 in each of the ribs near the outermost end. The notch 78 allows the outer hub surface 50 of the adjacent end cap 34 to seat therein. That is, the notch 78 provides clearance for the outer hub surface 50 of the adjacent end cap 34.

In order to assemble end caps 34 of this configuration, separation elements 12 must be constructed having an end cap of the type disclosed having an outer annular flange 70 on one end, and an end cap 34 of the type having the outer annular recess 72 on the other end. Adjacent separation elements 12 are axially aligned and pushed together such that the outer leg of the L-shaped catch 66 engages the slot 68. The end caps are rotated relative to one another (in a clockwise direction as shown in FIG. 4) until the L-shaped catch 66 bottoms out in the slot 68. In certain embodiments, the protrusion 74 would engage the recess 76 providing an audible and physical indication that the end caps are locked relative to one another. In certain other embodiments, as shown in FIGS. 3 and 6, the protrusion 46 (seen only in FIG. 3) on the flange 44 of ribs 42 engages the channel 47 defined by the ribs 42 of an adjacent end cap, as shown in FIG. 6, to provide audible and physical feedback that the end caps 34 are locked.

The connection between adjacent end caps 34 is shown best in FIG. 1. With the respective end caps 34 in the locked position, the annular flange 70 surrounds the annular recess 72. In this manner, the annular flange 70 provides added support to the connection between adjacent end caps and helps prevent flexing of the two adjacent separation elements relative to one another, particularly during installation of the separation elements in the pressure vessel 24.

While two preferred locking structures 52 are provided, it will be appreciated that any suitable structure may be used to lock the respective end caps 34. For example, push type connectors having an enlarged tapering head can be inserted into holes on an adjacent end cap. Alternatively, axially-extending fingers can be incorporated into the end cap which deflect radially over ledges or protrusions on the adjacent end cap. The end caps are locked together when ledges or protrusions on the fingers catch behind corresponding ledges on the adjacent end cap. Yet another alternative relies upon single or multiple sets of opposing spiral grooves and ridges to lock the elements together in typical threaded fashion. It is preferred that the locking structure be such that it can provide a predetermined minimum force on the seal structure between adjacent permeate tubes 18 as will be discussed below. Preferably, the locking structure will also permit the sealing force to increase in response to axial forces applied to the separation elements 12 by the axial flow of the fluid through the module 10. Such forces arise naturally due to flow-induced pressure drop within the retentate channel sheet 16 of the separation element.

As shown in FIG. 1, the end caps may also include an outer O-ring groove 80 for receiving an O-ring 82. The O-ring 82 provides a seal between the outermost surface of the end cap 34 and the inner surface of the pressure vessel 24. The seal 82 prevents the flow of feed and retentate fluid past the end cap at the area of the seal. The O-ring 82 is shown at outer surface of the end cap 34. It will be appreciated, however, that the O-ring 82 may provide a seal between respective outer hub surfaces 50 of adjacent end caps. If the O-ring seal is provided at the outer hub surface, feed and retentate fluid will be precluded from flowing from outside of the separation element 12 through the end cap at the outer hub surface. In such a case, the O-ring 82 between the end cap and the pressure vessel may or may not be used. It will also be appreciated that the O-ring is but one of many suitable seal configurations. The V-cup and the six-lobed seal, such as the Multiseal from Precision Associates, Inc., are proven alternatives.

An important feature of the present invention is to provide an improved seal between the permeate tubes 18 of adjacent separation elements 12. It is desirable to provide a reliable seal between the permeate tubes 18 of adjacent separation elements 12 to prevent any contamination from the flow of feed or retentate fluid into the permeate tube 18 at the connection.

Generally, the sealing structure comprises a seal surface that is connected with the permeate tube 18 and a seal. The seal surface is adapted to engage a sealing member and axially compress the sealing member between the seal surface of a first separation element 12 and the seal surface of an adjacent of said separation elements 12. As used herein, the seal surface can be connected to the permeate tube, either by being an integral element of the tube itself, or can be a second member, such as the inner hub of the end cap 34 which is directly adjacent to the permeate tube 18 and which can be connected thereto. The connection may also be fixed in certain embodiments, such as when the inner hub is spin or solvent welded to the permeate tube. The connection may also not be fixed, such as when the inner hub engages a second sealing member (not shown) at the interface between the permeate tube and the inner hub opening.

Figure 5:
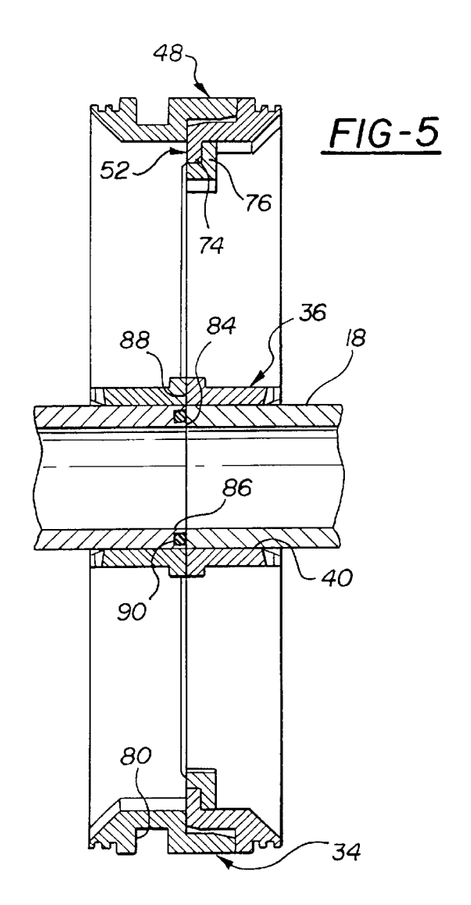
FIG. 5 is a cross-sectional view partially broken away showing one preferred arrangement of the seal structure.

In one preferred arrangement of the sealing structure, as shown in FIGS. 2 and 5, the seal surface comprises first 84 and second 86 permeate tube end surfaces. That is, the permeate tube 18 extends between its first 84 and second 86 end surfaces. The first 84 and second 86 end surfaces are annular, preferably circular in cross section. Each of the first 84 and second 86 end surfaces are generally flat.

At least one of the first 84 and second 86 end surfaces includes an annular groove 88. As seen in FIGS. 2 and 5, the annular groove is on the first end surface 84. The annular groove 88 is for receiving and retaining a sealing member therein. Preferably, as shown in exploded view in FIG. 2, the sealing member comprises an O-ring 90. The width of the groove 88 is slightly smaller than the cross section of the O-ring 90. In this manner, the O-ring 90 will be slightly compressed into the groove 88. Alternatively, the inside diameter of the O-ring 90 is slightly smaller than the inside diameter of the groove 88. In this manner, the O-ring 90 will be slightly stretched over the groove. A friction fit will thus be provided to retain the O-ring 90 in the groove 88. Also, the depth of the groove 88 is slightly less than the cross section of the O-ring 90. This allows the O-ring 90 to protrude from the groove 88 to engage the second end surface 86 of the adjacent separation element 12. While a groove 88 is preferred to retain the O-ring 90 in proper orientation, it will be appreciated that within the scope of the present invention, the sealing member may be retained in proper position using alternate methods, such as for example, the use of a suitable adhesive. In this case, the groove 88 may be eliminated and both end surfaces 84, 86 will be flat over the entire surface. The O-ring 90 can then be secured to one of the end surfaces 84, 86. Alternatively, small ribs protruding from the side walls of the groove may be employed to create regions where the effective groove width is smaller than the cross section of the O-ring 90. In this manner, the O-ring 90 is slightly compressed when inserted into the groove. Additionally, while an O-ring 90 is the preferred sealing member, it will be appreciated that any suitable sealing structure, such as for example a compression seal or a seal with a non-circular cross section, may be used within the scope of the present invention. Seals of non-circular cross-section include the four-lobed seal, such as the Par4 seal from Parker Hannifin Corporation, the six-lobed seal, such as the Multiseal from Precision Associates, Inc., the Tetraseal, from Goshen Rubber Company, the Press-In-Place seal, from Parker Hannifin Corporation, and other well known seals such as the U-cup and V-cup.

As shown in FIG. 5, the end caps 34 are secured on the respective permeate tubes 18 so as to allow the first end surface 84 of the first permeate tube 18 to contact the second end surface 86 of the second permeate tube. In this arrangement, a fluid tight seal between the inner hub 36 and the outer surface of the permeate tube 18 is not critical. Thus, the inner hub 36 may be secured to the outer surface of the permeate tube in any manner, including, for example a frictional fit, by the use of adhesives, by spin welding or by solvent welding. Indeed, any manner of connecting the inner hub 36 to the permeate tube 18 is within the scope of the present invention. Alternatively, in this embodiment, the end cap 34 may be secured directly to the ends of the leaves 14 or to the cover.

In the preferred embodiment, the end caps 12, are unitarily formed from a material capable of being spin welded or solvent welded to the permeate tube or the permeate interface tube, as set forth below. Such materials may include, ABS (acrylonitrile-butadiene-styrene polymer) or any other thermal plastic for example, polysulfone PVC or the like. Further suitable materials will include any thermoset or two-part reaction molding compounds such as urethanes or epoxies.

In order to perfect the seal of the type describe above between permeate tubes 18 of adjacent separation elements 12, two elements 12 are obtained. The first end surface 84 of the permeate tube 18 of the first separation element 12 comprises the generally flat surface and having the groove 88 thereon. The O-ring 90 is slightly compressed and placed in the groove 88. The first and second separation elements 12 are placed adjacent one another such that the respective end caps align to allow the locking structure to coact as described above.

The O-ring 90 is axially compressed between the respective first 84 and second 86 end surfaces of adjacent permeate tubes 18. The locking structure 52 secures the adjacent end caps 34 and thereby the adjacent separation elements 12. The O-ring 90 prevents any fluid in the feed or retentate streams from entering the permeate tube 18 at the junction between adjacent separation elements 12. By properly positioning the end caps 34 on the permeate tubes 18, a predetermined axial force can be placed on the O-ring 90 to provide a proper seal between adjacent permeate tubes 18.

In an alternate preferred embodiment, as shown in FIGS. 1, 3 and 4, the inner hub end surfaces 38 on the end caps 34 provide the seal surface. As described above, the inner hub end surfaces 30 on the end caps 34 are generally flat surfaces. One of the inner hub end surfaces 38 on one end cap 34 preferably includes a groove 92 for receiving an O-ring 94. When this arrangement is used, a fluid tight seal must be perfected between the inner hub 36 and the outer surface of the permeate tube 18. More specifically, the annular opening 40 of the inner hub 36 must be connected with and sealed to the outer surface of the permeate tube 18. This fluid tight arrangement is necessary to prevent the flow of feed or retentate fluid between the inner hub 38 and the outer surface of the permeate tube 18. The preferred method of perfecting this fluid tight arrangement is to spin weld the inner hub 36 to the permeate tube 18. To facilitate this connection, the annular opening 40 of the inner hub 36 may be tapered. Additional methods of providing the fluid tight connection between the inner hub 36 and permeate tube 18 are within the scope of the present invention. By way of example, the inner hub 36 may be solvent welded to the permeate tube. Alternatively, suitable adhesives may be used. Further, a fluid impermeable seal may be perfected using a suitable sealing member between the inner hub 36 and the permeate tube 18. Any suitable sealing method may thus be used to provide a seal between the inner hub 36 and the permeate tube 18.

As above, while a groove 92 is preferred to retain the O-ring 94 in proper orientation, it will be appreciated that within the scope of the present invention, the sealing member my be retained in proper position using alternate methods, such as for example the use of a suitable adhesive. In this case, the groove 92 may be eliminated and both adjacent inner hub end surfaces 38 will be flat over the entire surface. The O-ring 94 can then be secured to one of the inner hub end surfaces 38. Additionally, while an O-ring 94 is the preferred sealing member, it will be appreciated that any suitable sealing member, such as for example a compression seal, may be used within the scope of the present invention.

In order to perfect the seal of the type describe above between permeate tubes 18 of adjacent separation elements 12, two elements 12 are obtained. The inner hub end surfaces 38 of end caps 34 of adjacent separation elements comprise the generally flat surfaces. One of the inner hub end surfaces 38 includes the groove 92 thereon. The end caps 34 are secured on the respective permeate tubes 18 to provide the fluid tight connection between the end caps 34 and the permeate tubes 18. Preferably, the end caps 34 are spin welded to the respective permeate tube 18. The O-ring 94 is slightly compressed and placed in the groove 92. The first and second separation elements 12 are placed adjacent one another such that the respective end caps 34 align to allow the locking structure to coact as described above. The end caps 34 are secured on the respective permeate tubes 18 so as to allow the inner hub end surface 38 of the first end cap 34 to contact the inner hub end surface 38 of the end cap 34, as best seen in FIG. 1.

The O-ring 94 is axially compressed between the inner hub end surface 38 of the first end cap 34 and the inner hub end surface 38 of the second adjacent end cap 34. The locking structure 52 secures the adjacent end caps 34 and thereby the adjacent separation elements 12. Again, by properly positioning the end caps 34 on the permeate tubes 18, a predetermined axial force can be placed on the O-ring 94 to provide a proper seal between adjacent inner hub end surfaces 38. The combination of the O-ring 94 sealing adjacent inner hub end surfaces 38 along with the fluid tight connection between the inner hubs 36 and permeate tubes 18 prevents any fluid in the feed or retentate streams from entering the permeate tube 18 at the junction between adjacent separation elements 12.

By providing the seal between the inner hub end surfaces 38 of end caps 34 of adjacent separation elements 12, certain advantages are obtained. First, the end caps 34 can be positioned on the permeate tubes in such a manner that the end surfaces 84, 86 of adjacent permeate tubes do not have to contact one another. Second, the inner hub end surfaces 38 provide a larger surface on which to locate the sealing member. Finally, the axial registration of the tube end surface 86 relative to the locking structure 52 becomes less critical.

It will be appreciated that sealing means described herein may be used in combination with one another in order to further improve the integrity of the module.

The module 10 also includes an element interface adapter, generally indicated at 96. The interface adapter 96 is connected to an outer end cap 34 of the outermost separation element 12 in the pressure vessel 24 as best seen in FIG. 1. The interface adapter 96 provides a fluid-tight seal between the permeate tube 18 of the first and in some embodiments the last separation element 12 in the pressure vessel 24 and a permeate interface tube 98. This connection permits permeate to exit, and in certain embodiments enter the pressure vessel 24 without becoming contaminated from feed or retentate fluid in the interior of the pressure vessel 24.

The interface adapter 96 comprises an end cap 34 taking any of the configurations as set forth above and as shown for example in FIGS. 1–4. The end cap 34 includes the locking structure 52 as previously described. The end cap 34 is connected to a permeate interface tube 98. The permeate interface tube 98 of the interface adapter 96 does not have any holes therethrough as do the permeate tubes 18 described above. The permeate interface tube 98 further does not have any leaves 14 connected thereto. The permeate interface tube 98 is connected to the inner hub 36 of the end cap in any manner as set forth above for connecting the permeate tube 18 with the inner hub 36.

In one preferred embodiment, as shown in FIG. 1, the permeate interface tube 98 is connected in a suitable fluid tight manner with inner hub 36 of the end cap 34, such as by spin welding. Again, and as set forth above, the inner hub 36 may be tapered to facilitate the spin welding process. The inner hub end surface 38 is preferably flat. The inner hub end surface 38 engages an O-ring 94 contained in a groove 92 on an inner hub end surface 38 of an adjacent end cap 34. The end caps 34 are then locked in the manner set forth above. In this manner, the O-ring 94 between the end cap 34 of the last separation element 12 and the end cap 34 of the interface adapter is held in axial compression. This provides a fluid tight relationship between the permeate tube 18 of the last separation element 12 and the permeate interface tube 98.

While the inner hub end surface 38 of the end cap 34 of the interface adapter 96 is shown to be flat over the entire surface, it will be appreciated that this inner hub end surface may also include a groove thereon for receiving the O-ring.

In such a case, it is preferred that the inner hub end surface 38 of the adjacent end cap 34 of the separation element 12 be flat. Further, while as shown in FIG. 1, the seal is perfected between respective inner hub end surfaces 38 of adjacent end caps 34, it will be appreciated that the seal can be perfected between one of the end surfaces 84, 86 of the permeate tube 18, and the end surface 100 of the permeate interface tube 98. This is accomplished by providing a groove on one of the end surfaces 84, 86 of the permeate tube 18 or on the end surface 100 of the permeate interface tube 98. The seal is then perfected in the manner as set forth above for providing a seal directly between the end surfaces 84, 86 of permeate tubes 18 of adjacent separation elements 12.

A permeate connector is generally indicated at 102. The permeate connector 102 extends through the permeate opening or port 32 in the end plate 26. The permeate connector 102 includes a first tubular section 104. The first tubular section 104 has an inner diameter that closely matches the outer diameter of the permeate interface tube 98. The inner surface of the first tubular section 104 includes an annular groove 106 for receiving an O-ring 108. The O-ring 108 provides a fluid tight seal between the inner surface of the first tubular section 104 and the outer surface of the permeate interface tube 98. In this manner, feed or retentate fluid is prevented from entering the permeate interface tube 98 at this connection.

The permeate connector 102 further includes a second tubular section 110. The second tubular section 110 is integral with the first tubular section 104 and has a relatively smaller diameter than the first tubular section 104. A wall 112 connects the first 104 and second 110 tubular sections. The second tubular section 110 extends through the permeate opening 32 in the end plate 26. The second tubular section 110 further includes a threaded opening 114. The threaded opening 114 is for receiving a threaded pipe to carry the permeate out of the pressure vessel 24.

An end cap 34 of the type having the permeate interface tube 98 is preferably used at both ends of the module 10. That is, the first end cap 34 on the first element 12 includes a permeate interface tube 98 extending therefrom, and the last end cap 34 on the last element includes, as shown in FIG. 1 includes a permeate interface tube 98 extending therefrom. When only one module 10 is to be used, the permeate interface tube at the first end, not shown, is inserted into a permeate connector 102 that is fitted with a threaded plug or pipe at the opening 114. The second end is as shown in FIG. 1. This arrangement allows the feed and retentate to flow through the leaves 14 in the direction of the arrows in FIG. 1. The permeate flows through the permeate tube 18 in the direction of the arrow in FIG. 1. As the feed and retentate pass further through the module 10, the concentration of impurities concentrates in the stream. Thus, a relatively concentrated retentate exits the module 10 at the end opposite to that having the feed opening 28.

In certain embodiments or processes, it may be desirable to carry out further separation on the retentate. In such a case, the retentate exiting the module 10 can be directed to the feed tube 30 of an adjacent module 10. In such a case, it may also be desirable to connect the permeate tubes of the first and second modules. To accomplish this, the end plates 26 of the first module both include retentate openings. Each end of the outermost separation element 12 will contain a permeate interface tube 98 connected with a permeate connector 102. One of the permeate connectors 102 of the first module 10 will be connected with the permeate connector of the next adjacent module 10 by a suitable pipe connected to the threaded opening. If two modules 10 are to be used, the endmost permeate connector 102 may be plugged as described above. In this case, permeate will flow out of the connected modules only from one end.

To construct a single module 10, a pressure vessel 24 is provided. A first separation element 12 is obtained. One end cap 34 of the first separation element 12 is connected to another end cap 34 having a permeate interface tube 98. This assembly is then slid into the opening 25 of the pressure vessel 24 until the first separation element 12 is sufficiently supported in the pressure vessel 24. A second separation element is then secured to the first separation element 12, by the rotating the second separation element 12 relative to the first separation element 12. Preferably, either audible or physical feedback is provided to indicate the respective end caps 34 are locked together. This locking also perfects a seal between adjacent permeate tubes 18. This process is repeated until the last separation element has been placed in the opening 25 of the pressure vessel 24. Then, an end cap having another permeate interference tube 98 is secured on the end cap 34 of the last separation element 12. An end plate 26 having the permeate connector 102 disposed in the permeate port 32 is then attached to each end of the pressure vessel 24 in the well-known manner. The first tubular section 104 of the permeate connector 102 is disposed about the outer surface of the permeate interface tube 98 and the O-ring 108 provides a seal between these components. At the first end of the vessel, the opening 114 is fitted with a threaded plug and a retentate tube is connected to the retentate opening 28. At the second end of the vessel, a pipe 116 is threaded to the opening 114 and a feed tube 30 is connected to the feed opening 28.

With the connection between adjacent elements 12 and with the element interface adapter 96 made in this manner, a more reliable seal can be provided at the permeate tube connections. The number of seals needed to make the connection is also reduced. Further, the axial compression of the seals by the locking structure 52 provides a more reliable sealing arrangement. Finally, axial compression of the seal is enhanced by the naturally-occurring force arising from flow-induced pressure drop within the retentate channel sheet 16.

The disclosed embodiments are representative of presently preferred forms of the invention, but are intended to be illustrative rather than definitive thereof. Obviously, many modifications and variations of the present invention are possible in light of the above teachings. It is, therefore, to be understood that within the scope of the appended claims, the invention may be practiced otherwise than specifically described.

What is claimed is:

1. A separation element comprising:

a permeable separation body comprising a membrane defining a permeate channel in fluid communication with a first side of said separation body for collecting permeate;

a permeate tube extending along an axis between first and second ends and in fluid communication with said permeate channel;

a retentate channel on a second side of said permeable separation body;

first and second end caps disposed respectively about said first and said second ends of said permeate tube and having said permeable body there between, said end caps including a locking structure thereon adapted to releasably engage with corresponding end cap of an adjacently positioned separation element;

a seal surface connected to the permeate tube, and adapted to axially compress a sealing member between said seal surface and a seal surface of an adjacently positioned separation element, wherein said seal surface comprises an annular sealing surface secured about the outer circumference of the permeate tube, and is positioned in a plane perpendicular to the permeate tube, wherein said annular sealing surface includes an annular sealing member, to prevent fluid flow between said retentate channel and said permeate channel.

2. A separation element as set forth in claim 1 wherein said annular sealing surface includes an annular groove therein for receiving and retaining a sealing member.

3. A separation element as set forth in claim 2 comprising an O-ring seal for placement in said annular groove.

4. A separation element as set forth in claim 2 wherein said end cap comprising an inner hub on which said seal surface resides and said inner hub is spin welded to said permeate tube to prevent fluid flow between said inner hub and said permeate tube.

5. A separation element as set forth in claim 1 wherein engagement of said locking structure with corresponding end cap of an adjacent element provides compressive force on said sealing member to prevent fluid flow between said retentate channel and said permeate channel.

6. A separation element comprising:

a permeable separation body defining a permeate channel in fluid communication with a first side of said separation body for collecting permeate;

a permeate tube extending along an axis between first and second ends and in fluid communication with said permeate channel;

a retentate channel on a second side of said permeable separation body;

a seal surface connected to the permeate tube, and adapted to axially compress a sealing member between said seal surface and a seal surface of an adjacently positioned separation element, wherein said seal surface comprises an annular sealing surface secured about the outer circumference of the permeate tube, and is positioned in a plane perpendicular to the permeate tube, wherein said annular sealing surface includes an annular sealing member, to prevent fluid flow between said retentate channel and said permeate channel;

first and second end caps disposed respectively about said first and said second ends of said permeate tube and having said permeable body there between, said end caps including a locking structure adapted to releasably engage with corresponding end cap of an adjacently positioned separation element, said seal surface connected to said end cap to prevent relative movement of said locking structure and said seal surface.

7. A separation element as set forth in claim 6 wherein each of said first and said second end caps each define an inner hub having an inner hub end surface, and an outer hub defining an outer hub end surface, said locking structure disposed on said outer hub end surface.

8. A separation element as set forth in claim 7 wherein said end caps include a plurality of ribs extending between said inner hub and said outer hub.

9. A separation element as set forth in claim 8 wherein said locking structure comprises a plurality of projections and receptacles disposed about said outer hub, said projections of said outer hub adapted to releasably engage with corresponding receptacles of an outer hub of an adjacently positioned separation element in order to connect said separation element with adjacent separation element and to axially compress a sealing member there between.

10. A separation element as set forth in claim 9 further including an axially oriented protrusion on at least one said locking structure and said ribs for engaging a recess on one of said locking structure and said ribs of an adjacent element to provide feedback to indicate that said locking structure is secured.

11. A separation element as set forth in claim 6 wherein said seal surface defines an enclosed conduit having an inner diameter equal to or greater than the inner diameter of said permeate tube.

12. Am end cap for a separation element comprising:
   an inner hub defining an inner hub end surface;
   an outer hub defining an outer hub end surface;
   a plurality of ribs extending between said inner and said outer hubs;
   a groove on said inner hub end surface adapted to receive and retain an axial sealing member therein;
   a locking structure disposed on said outer hub surface, said locking structure including a plurality of projections and receptacles disposed about said outer hub, said projections of said outer hub adapted to releasably engage corresponding receptacles of an outer hub of an adjacent separation element to thereby connect said separation element with adjacent separation element and to axially compress said axial sealing member there between adjacent inner hub end surfaces.

13. An end cap as set forth in claim 12 further including a permeate interface tube extending therefrom secured in a fluid tight manner to said inner hub.

14. An end cap as set forth in claim 12 further including a compliant member on one of said locking structure or said ribs and a protrusion connected to said compliant member, said protrusion adapted to engage a corresponding notch on an adjacent separation element to provide feedback that said locking structure is secure.

15. A separation element as set forth in claim 6 wherein said permeable separation body comprises a spiral wound membrane.

16. A separation element as set forth in claim 1 or claim 6 further including a compliant member attached to at least one of said first and second end caps, a first protrusion on said first end cap, and a second protrusion on said second end cap, at least one of said first and second protrusions is attached to said compliant member so that deflection of the compliant member during locking allows said first protrusion to pass by an opposing second protrusion on an adjacent element and feedback is provided to indicate that said locking structure is secured.

* * * * *